(12) United States Patent
Salomon-Bahls et al.

(10) Patent No.: US 6,554,323 B1
(45) Date of Patent: *Apr. 29, 2003

(54) PLUG CONNECTOR FOR QUICK-RELEASE CONNECTION OF PRESSURIZED LINES

(75) Inventors: Bernd Salomon-Bahls, Halver (DE); Harald Hagen, Wipperfurth (DE); Volker Kaminski, Halver (DE)

(73) Assignee: Voss Automotive GmbH, Wipperfurth (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/625,897

(22) Filed: Nov. 27, 2000

Related U.S. Application Data

(63) Continuation-in-part of application No. 09/360,704, filed on Jul. 26, 1999, now Pat. No. 6,170,887.

(30) Foreign Application Priority Data

Jul. 26, 1999 (DE) ..................................... 299 12 935 U
Dec. 6, 1999 (DE) ..................................... 299 21 406 U

(51) Int. Cl.$^7$ ............................................... F16L 21/06
(52) U.S. Cl. ..................... 285/322; 285/323; 285/239; 285/382.5
(58) Field of Search ..................... 285/322, 39, 323, 285/243, 248, 239, 382.5

(56) References Cited

U.S. PATENT DOCUMENTS 4,890,865 A * 1/1990 Hosono et al. ............... 285/39
5,085,472 A * 2/1992 Guest .......................... 285/322
5,468,028 A * 11/1995 Olson .......................... 285/322
5,474,336 A * 12/1995 Hoff et al. .................... 285/322
5,505,501 A * 4/1996 Seabra ......................... 285/322
5,775,742 A * 7/1998 Guest .......................... 285/322
6,145,894 A * 11/2000 Myers ......................... 285/322
6,158,783 A * 12/2000 Johnson ....................... 285/322
6,170,887 B1 * 1/2001 Salomon-Bahls et al. ... 285/322
6,254,144 B1 * 7/2001 Hagan ......................... 285/322

FOREIGN PATENT DOCUMENTS

EP          0 247 214 A1   12/1987
EP              351466   *  1/1990   ................. 285/322
EP          0 373 272 A1    6/2000
JP              203688   *  7/1992   ................. 285/322

* cited by examiner

Primary Examiner—Daniel G. DePumpo
(74) Attorney, Agent, or Firm—Kilpatrick Stockton, LLP

(57) ABSTRACT

A socketless fitting for releasable connection of a pressurized line. The fitting has a housing body with a receiving opening to insert one end of the line, and an inner sleeve attached in the housing body in an arrangement that extends coaxially within the receiving opening for engagement into the inserted line end. The inner sleeve is fastened in the housing body media-tight around the periphery by a connector and preferably engages in the line media-tight around the periphery. A clamping element axially movable in the receiving opening cooperates with an inner surface of the housing body to secure the line end onto the inner sleeve. Media-tight outward sealing is accomplished by sealing engagement of the essentially rigidly secured inner sleeve in the line, because the inner sleeve itself is also tightly joined to the housing body.

21 Claims, 5 Drawing Sheets

Figure 1:
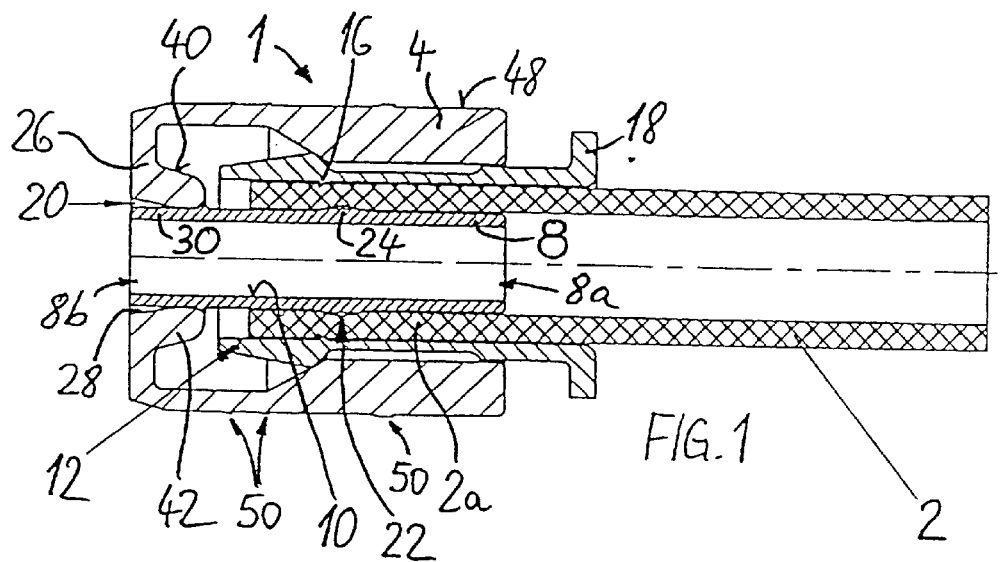

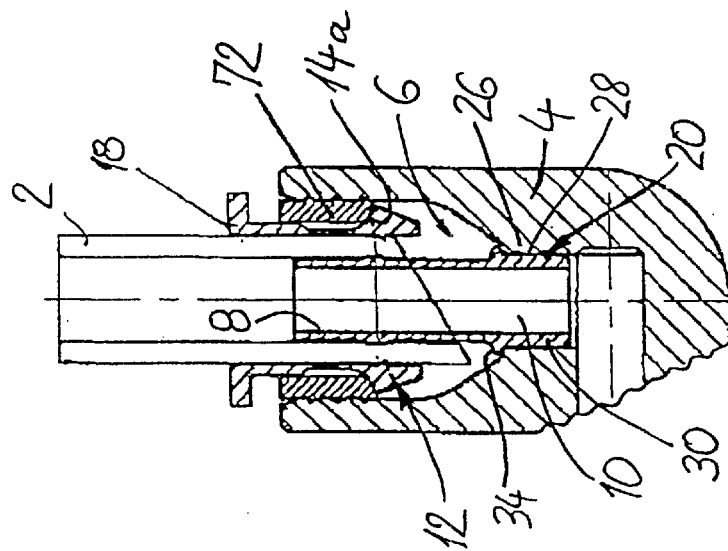
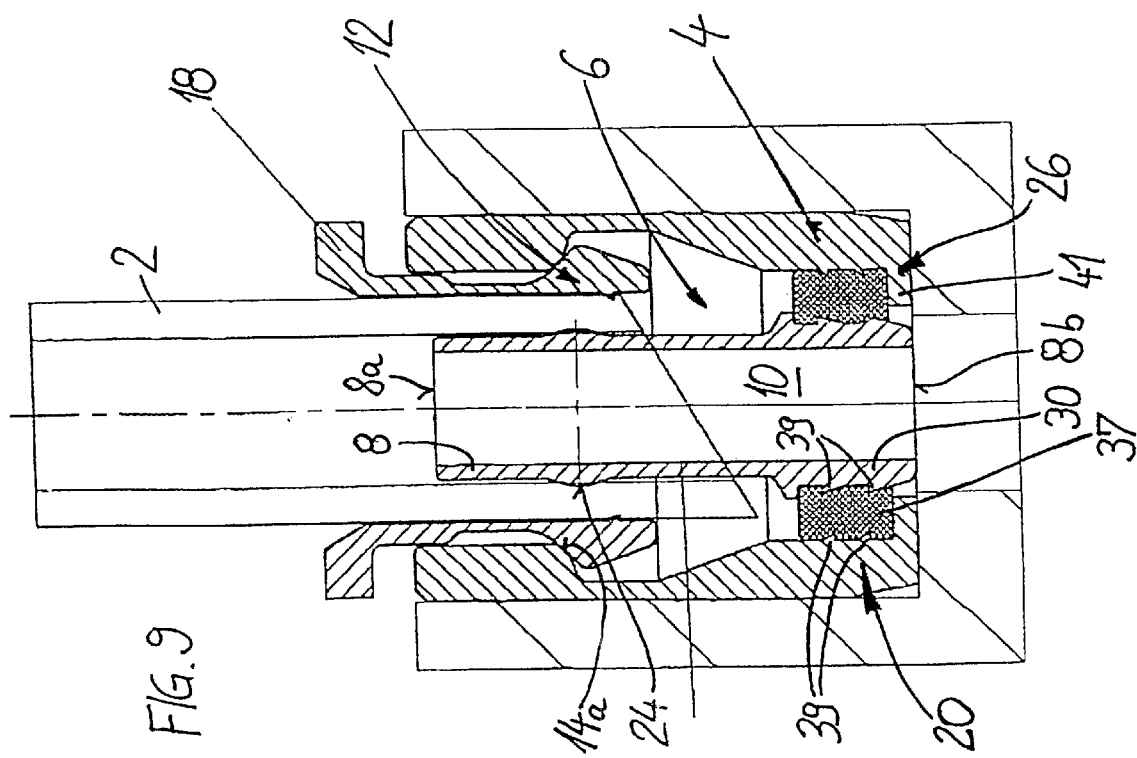

PLUG CONNECTOR FOR QUICK-RELEASE CONNECTION OF PRESSURIZED LINES

CROSS-REFERENCE TO RELATED APPLICATION

This is a continuation-in-part of application Ser. No. 09/360,704 filed Jul. 26, 1999 and now U.S. Pat. No. 6,170,887.

The present invention concerns a plug connector for releasable connection of a pressurized line, consisting of a housing body with a receiving opening to insert one end of the line, and with an inner sleeve attached in the housing body in an arrangement that extends coaxially within the receiving opening for engagement into the inserted line end, in which a clamping element is mounted to move axially in the receiving opening,.so that it cooperates with an inner conical surface of the housing body to hold the line and in so doing, acts radially inward with at least one retaining edge in form-fit or friction- and form-fit fashion against the outer periphery of the line.

This type of plug connector for pipelines and/or hose lines with a smooth outer peripheral surface is known from EP 0 247 214 B1. To seal the line connection, it is proposed that the sleeve-like, chuck-like clamping element be sealed on its end facing the insertion opening radially outward against the wall of the housing-receiving opening, as well as radially inward against the line by means of a sealing ring. These sealing rings are then connected to the clamping element in bonded fashion. The inner sleeve secured in the housing body via a snap connection engages in it with peripheral play for radial support of the line, since its outside diameter should be slightly smaller than the inside diameter of the line. This plug connector has essentially proven itself, but the seals connected to the clamping element in bonded fashion require costly manufacture.

A similar line coupling is known from EP 0 373 272 B1 (especially FIG. 9), which, however, is also quite costly to manufacture, since it consists of numerous individual parts. Two sealing rings are provided for sealing, which act on the outer periphery of the inserted line. In other embodiments, the inner sleeve engages in the line with a number of annular edges. This guarantees mechanical securing of the line; a clamping element, acting in the generic sense on the outer periphery of the line, is not provided here.

In addition, a similar connector had already been proposed, in which the inner sleeve engages in sealing fashion in the line, with a torus. However, it is prescribed therein that the clamping element, which can be moved to loosen or release the line and the inner sleeve with torus are adapted to each other and cooperate, so that during displacement of the clamping element, the torus is caused to engage in the line in sealing fashion or to be released or loosened from the interior of the line. This expedient, however, requires mobility, and for this purpose, at least partial axial slotting of the inner sleeve, so that the torus alone is not sufficient for sealing. Instead, a seal must additionally be present between the clamping element and the housing body, which must permit axial relative movements. A version that is demanding, in terms of design and manufacture, is therefore also involved.

The underlying task of the present invention is to devise a plug connector of the generic type described at the outset, which is characterized by simple and cost-effective design and manufacture.

This is achieved according to the invention in that the inner sleeve is fastened in the housing body media-tight around the periphery via connection means and preferably engages in the line media-tight around the periphery with means of sealing. Thus, according to the invention, media-tight sealing outward is guaranteed merely by the sealing engagement of the essentially rigidly secured inner sleeve in the line, because the inner sleeve itself is also tightly joined to the housing body. Special connection means are prescribed for this purpose, which can be made very simply and cost-effectively in different shapes. Some advantageous embodiments of this are described below.

The inner sleeve preferably has at least one sealing torus on its outer periphery as means of sealing. In this region and in the region axially between the sealing torus and the sealing connection of the inner sleeve with the housing body, the inner sleeve is essentially rigid and completely closed, i.e., designed without axial/radial wall openings, so that a sealing line connection is guaranteed without additional seals acting, for example, on the outer periphery of the line. The sealing torus according to the invention is adapted with respect to its outside diameter to the inside cross section of the line, so that the line can be mounted onto the inner sleeve or withdrawn from it again by frictional closure, in which internal sealing is guaranteed in the mounted state by frictional retention of the line on the sealing torus. The line can therefore advantageously be inserted quickly and simply and at any time, released again by simple pulling, after the clamping element has also been brought into a loosening position that releases the outside periphery of the line.

Other advantageous configurations of the invention are contained in the subordinate claims, as well as the following description.

Figure 2:
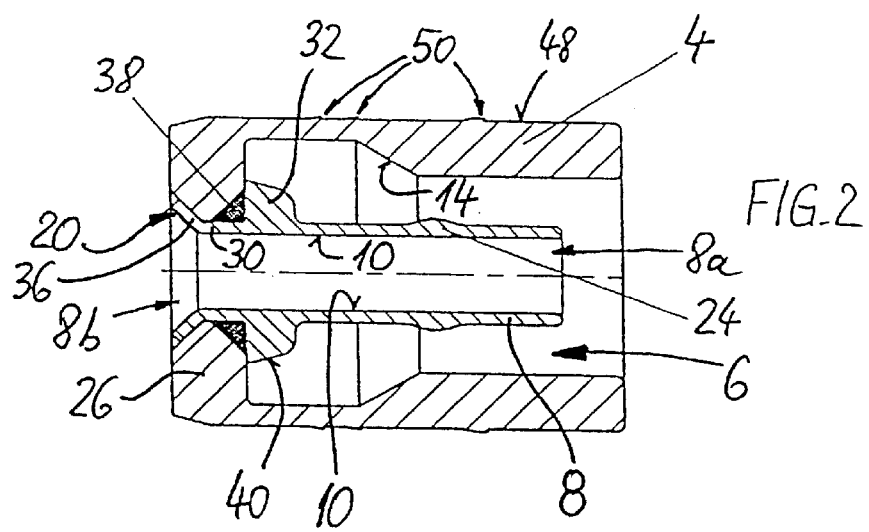
Figure 3:
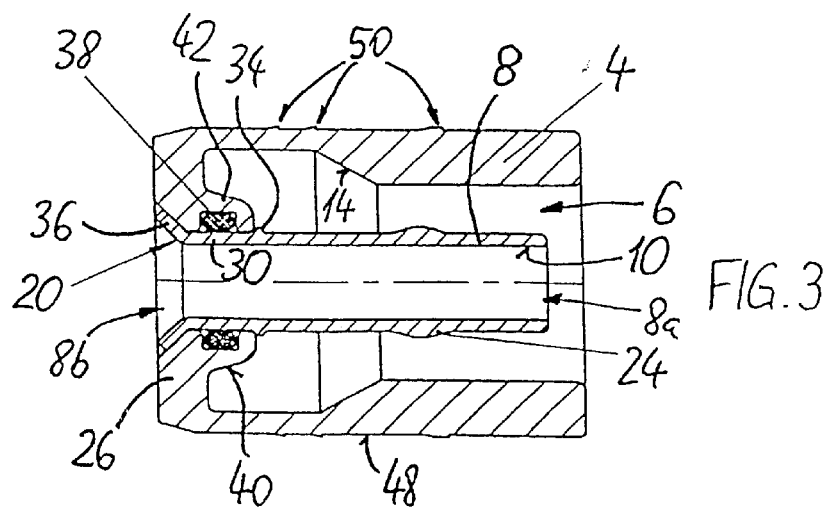
Figure 4:
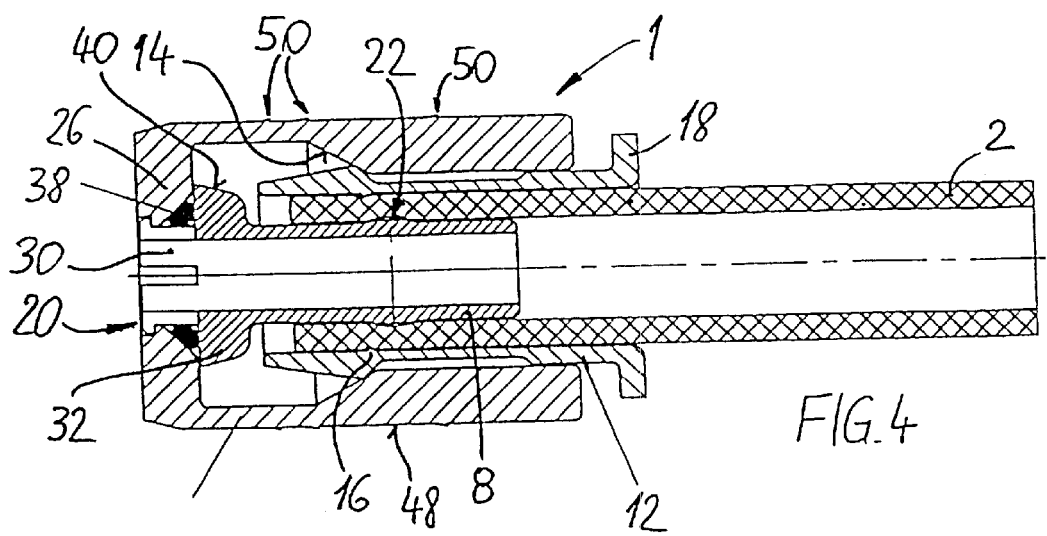
Figure 5:
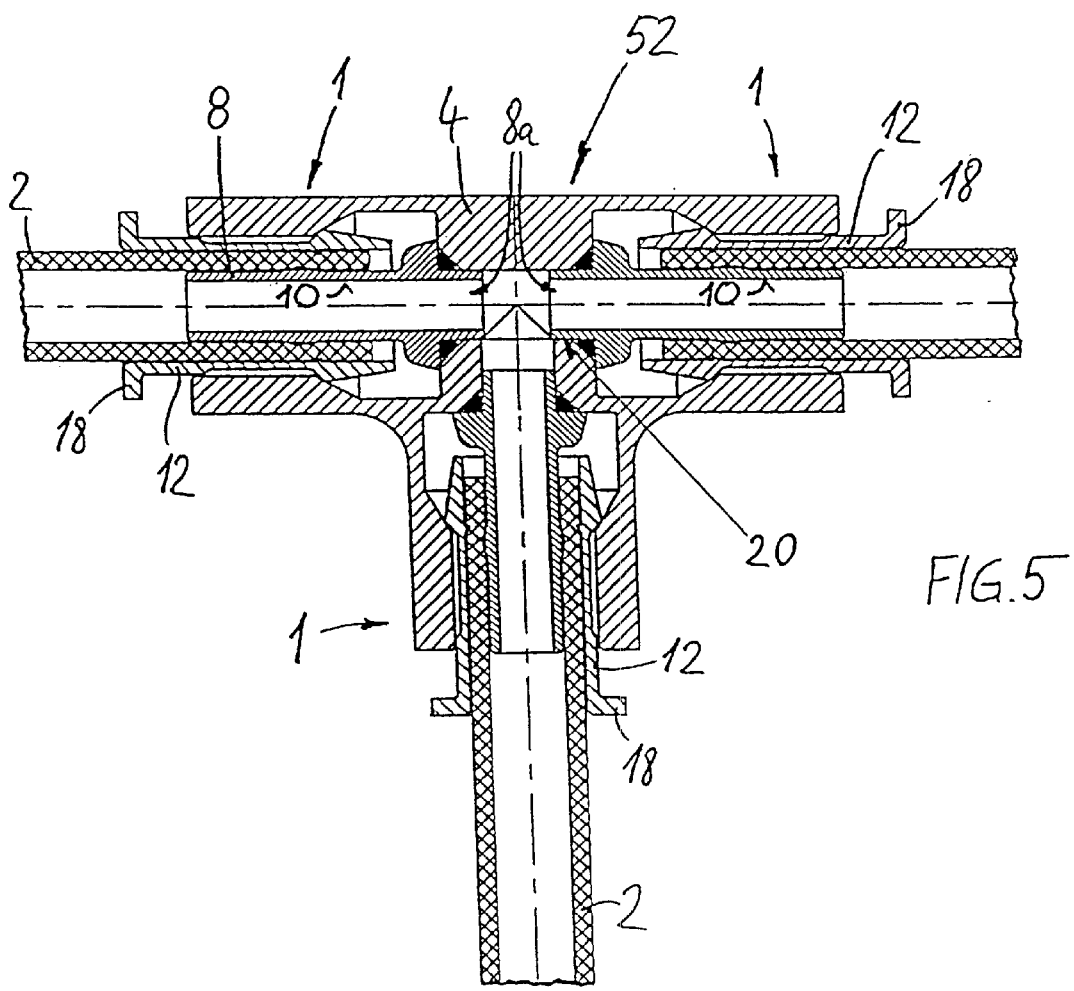
Figure 6:
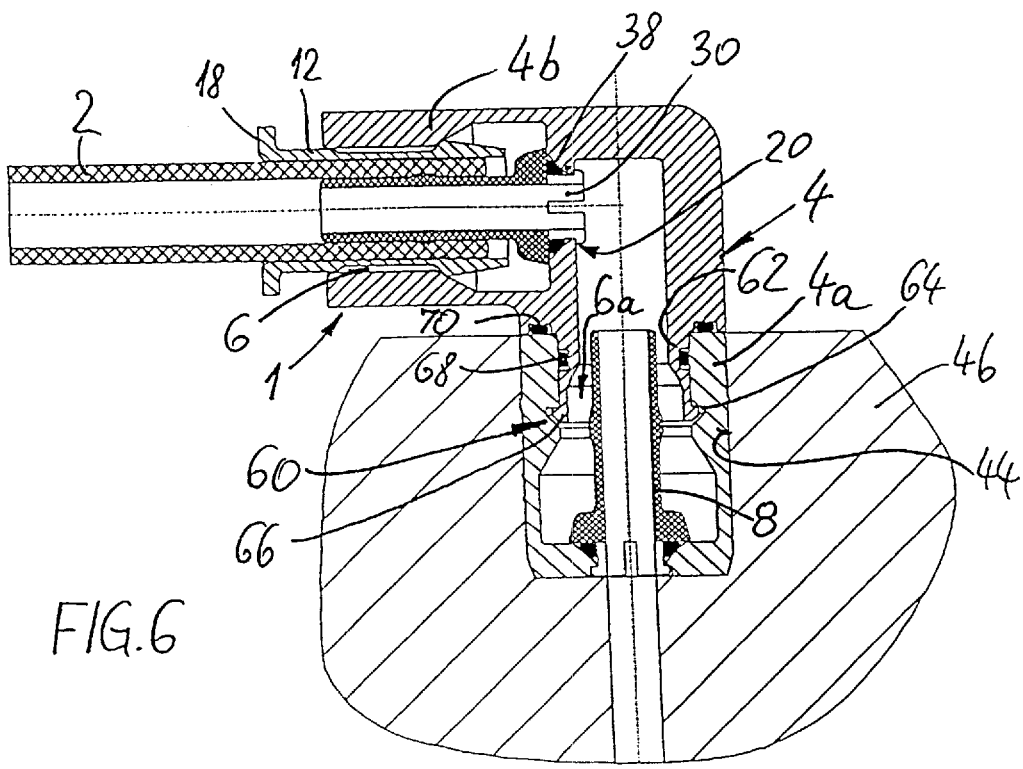
Figure 7:
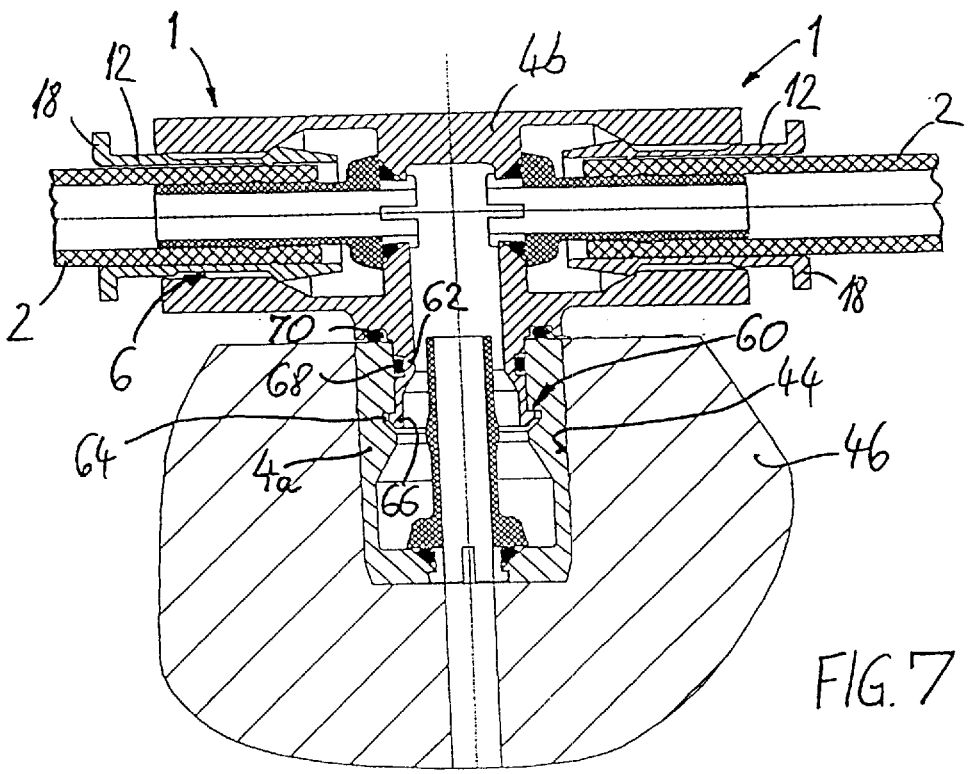
Figure 8:
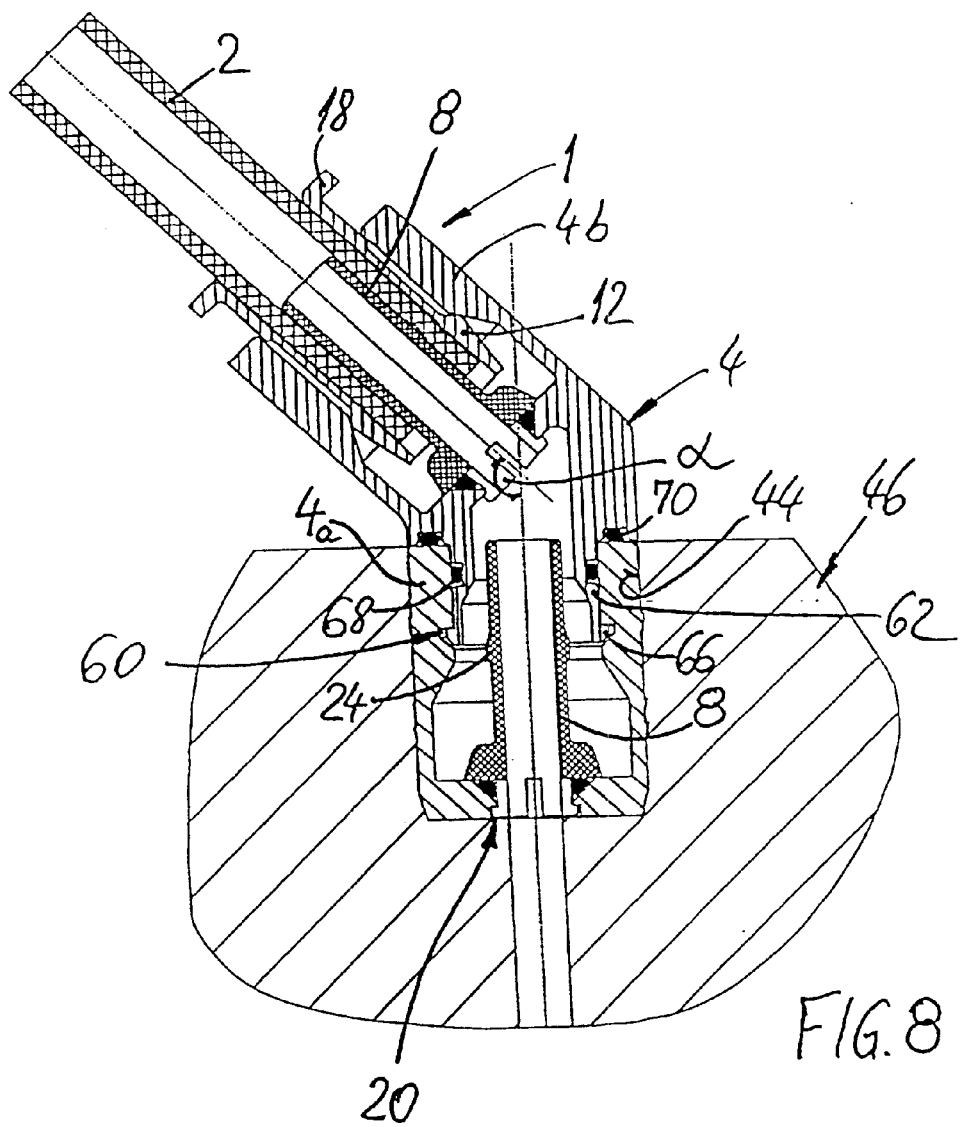

The invention will now be explained in greater detail with reference to several preferred embodiments and specific variants depicted in the drawings. In the drawings:

FIG. 1 shows an axial section of a first embodiment of a plug connector according to the invention in the inserted and locked state of a line, FIG. 2 shows another embodiment of the plug connector, also in axial section, but without showing the clamping element and line, FIG. 3 shows a depiction of another embodiment as in FIG. 2, FIG. 4 shows a depiction as in FIG. 1 of another embodiment, FIG. 5 shows a section of a plug connector designed as a transition connector, here especially as a T-connector, FIG. 6 to FIG. 8 show additional advantageous configurations of the plug connector, FIG. 9 shows another embodiment with alternative connection means of the inner sleeve, namely in the form of an axial section analogous to FIG. 1, and FIG. 10 shows an advantageous additional refinement of the plug connector.

The same parts in the different figures of the drawing are always provided with the same reference numbers and are therefore generally described only once.

As initially follows from FIGS. 1 to 4, a plug connector 1 according to the invention serves for quick-release connection of (at least) one pressurized line 2 (pipeline or hose line). The plug connector 1 consists of a housing body 4 with (at least) one receiving opening 6 (see FIGS. 2 and 3), as well as an inner sleeve 8, which is attached in the housing body 4 on the side opposite the discharge side of receiving opening 6, so that it extends coaxially through the receiving opening 6, in order to engage in the inserted line 2 or in its end 2a for radial support (FIGS. 1 and 4).

The inner sleeve 8 engaging in line 2 forms a transition channel 10 for a pressure medium conveyed through line 2, especially compressed air in pneumatic systems. Consequently, the inner sleeve 8 has openings 8a and 8b on both ends, the one opening 8a lying in the line 2 and the other opening 8b lying in the fastening region of inner sleeve 8 in housing body 4.

A sleeve-like clamping element 12 that encloses the inserted line 2 in the fashion of a clamping jaw or clamping chuck is mounted in receiving opening 6 to move axially to mechanically secure the inserted line 2, so that it cooperates with an inner conical surface 14 of housing body 4 to secure line 2 and, in so doing, acts radially inward with at least one retaining edge 16 in form-fit fashion, or at least in friction- and form-fit fashion against the outer periphery of line 2. For this purpose, the clamping element 12 is made radially elastic by at least one axial slit. The clamping element 12 can consist of plastic or metal. When the clamping element 12 protrudes outward from the receiving opening 6 with an activation section 18, it can be pushed away from the inner conical surface 14 for loosening of line 6 manually, so that the retaining edge 16 releases line 2 by radial widening.

The inner sleeve 8 according to the invention is attached rigidly arid media-tight around the periphery in housing body 4 via special connection means 20. The inner sleeve 8 according to the invention also engages with sealing means 22 media-tight around its periphery in line 2. (At least) one rigid, shape-stable sealing torus 24 is preferably arranged as sealing means 22 on the outer periphery of inner sleeve 8 (see especially FIGS. 2 and 3). This sealing torus 24 is adapted to the inside cross section of line 2 with respect to its largest outside diameter, so that the line 2 can be mounted frictionally onto inner sleeve 8 with slight elastic expansion or withdrawn from it again. In the mounted state, internal sealing is guaranteed by frictional retention of line 2 on the sealing torus 24.

As regards the connection means 20 according to the invention, these consist in all preferred embodiments of an annular collar 26 of housing body 4 extending radially inward and a mounting section 30 of inner sleeve 8 tightly attached in an opening 28 of annular collar 26. There are different possibilities that will be explained in greater detail below for the rigid and tight attachment of mounting section 30 within opening 28 (FIG. 1).

According to FIG. 1, the mounting section 30 of inner sleeve 8 is fastened in bonded fashion and thus peripherally tight in opening 28 of housing-annular collar 26. Specifically, this can involve tight gluing or welding.

In the embodiments according to FIGS. 2 to 4, the mounting section 30 of inner sleeve 8 is secured in form-fit fashion in opening 28 of annular collar 26. The inner sleeve 8 has contact means on the side of the annular collar 26 facing the line receiving opening 6 lying axially on the annular collar, especially in the form of a radial annular connector 32 (FIGS. 2, 4) or torus 34 (FIG. 3). Fixation means are provided on the opposite end of mounting section 30, for example, according to FIGS. 2 and 3, in the form of a radial, preferably conical, sleeve expansion 36.

According to FIG. 4, the connection means 20 can advantageously be formed by a form-fit snap connection. For this purpose, the mounting section 30 of inner sleeve 8 consists of elastic locking arms formed by axial slits that engage behind.annular collar 26 in form-fit fashion.

In the embodiment according to FIG. 9, an annular.or sleeve-like press-fit element 37 that preferably consists of plastic is arranged as the connection means 20 between the mounting section 30 of the inner sleeve 8 and the housing body 4 and its respective annular collar 26. Peripheral holding ribs 39 may be advantageously provided similarly to pipe arbor profiles on the outer peripheral surface of the mounting section 30 of the inner sleeve 8 and/or on the inner peripheral surface of the annular collar 26 of the housing body 4 so that the holding ribs 39 are pressed into the material of the press-fit element 37 for retention purposes and for forming a seal when the connection by means of pressing is produced. This means that, in particular, a form-fit or at least a friction- and form-fit is also achieved. The press-fit element 37 is advantageously seated on an annular ledge 41 of the housing body 4 and the respective annular collar 26, which protrudes radially inwardly Finally, it can be prescribed as an alternative that the mounting section 30 of inner sleeve 8 be pressed firmly and tightly into the opening 28 of annular collar 26 in this respect, see, in particular, FIG. 10 The pressed-in surfaces can advantageously have a specified surface structure for this purpose, for example, knurling.

Especially in the embodiments with form-fitting attachment of inner sleeve 8, at least one elastic peripheral seal 38 is also provided, which seals the annular gap between inner sleeve 8 and housing body 4. The peripheral seal 38 expediently sits radially between housing-annular collar 26 and mounting section 30 of inner sleeve 8. For this purpose, the versions according to FIGS. 2 to 4 are referred to. According to FIG. 2, the seal 38 sits in the angular region between the mounting section 30 and the adjacent annular connector 32 of inner sleeve 8 in an annular chamber formed by internal chamfering of annular collar 26. The same also applies to the embodiment according to FIG. 4. According to FIG. 3, the annular collar 26 has an internal, radial annular groove within its opening, in which the peripheral seal 38 is arranged so that it lies radially on the outer periphery of mounting section 30.

In further advantageous configuration of the invention, a counterconical surface 40 is formed and arranged within housing body 4, so that the clamping element 12 can be spread radially to release line 2 by displacement against counterconical surface 40. In the embodiments according to FIGS. 2, 4 and 5, the counterconical surface 40 is advantageously formed on the annular connector 32 designed in one piece with inner sleeve 8, which simultaneously also serves as a stop for the form-fitting attachment. In the alternatives according to FIGS. 1 and 3, the counterconical surface 40 is formed on an axial annular projection 42 of housing body 4, designed in one piece with housing-annular collar 26.

As also follows from FIGS. 1 and 4, the sealing torus 24 of inner sleeve 8, viewed in the axial insertion direction, is arranged roughly in a region in which the retaining edge 16 of clamping element 12 also lies in its locking position that secures line 2. However, the retaining edge 16 preferably lies axially somewhat deeper inside the receiving opening 6 than the sealing torus 24, so that these two functional means (16 and 24) advantageously mutually support each other both with respect to the sealing effect and the holding effect. This means that the retaining edge 16 forces line 2 against inner sleeve 8 radially, just behind sealing torus 24, which, on the one hand, improves sealing, but also improves mechanical clamping.

In the embodiments according to FIGS. 1 to 4, the housing body 4 is designed as a press-in cartridge that can be inserted tightly on the periphery in an opening 44 of (in principle, any) aggregate part 46 (cf. FIGS. 6 to 8 for this purpose). The housing body 4 has clamping and sealing means 50 especially on its cylindrical outer peripheral surface 48. These are, in particular, annular indentation elements that can guarantee both mechanical clamping and sealing. Optionally, at least one elastic seal can additionally be provided (not shown).

As regards the embodiment in FIG. 5, this is a transitional connector 52, which consists of at least two, but, as shown as a T-connector, consists of three plug connectors 1 of the type according to the invention. In this case, a unitary housing body 4 with a corresponding number of line receiving openings 6 is provided.

Since the housing body 4 and inner sleeve 8 in all embodiments according to the invention are two separate, individually produced parts, these parts, in principle, can consist of any materials and material combinations. To achieve the best possible rigid support of line 2, the inner sleeve 8 preferably consists of metal, for example, brass. This also favors formation of the sleeve expansion 36 in the embodiments according to FIGS. 2 and 3. Moreover, the contour in the region of sealing torus 24 can be formed by shaping (upsetting). In principle, however, a turned part can also be involved. The embodiment in FIG. 4 with a snap attachment of inner sleeve 8 is expediently made from an appropriate plastic.

The housing body 4 can also consist of plastic or metal. Metal is preferred for the design as a press-fit cartridge according to FIGS. 1 to 4. An appropriate plastic can also be used for the embodiment according to FIG. 5.

FIGS. 6 to 8 show special embodiments, in which the housing body 4 consists of two individual parts that can be joined, an insertion part 4a that can be inserted, especially in the manner of a press-fit cartridge, into a hole 44 of any aggregate part 46 and a connection part 4b that can be connected to line 2. The type of connection of line 2 with connection part 4b is, in principle, any arbitrary connection, i.e., actually independent of the embodiments already described. However, it is preferably one of the versions of the plug connector 1 according to the invention. The insertion part 4a according to the invention is designed here so that it can be connected to the connection part 4b or directly to line 2. The insertion part 4a is therefore a connection adapter.

The insertion part 4a and the connection part 4b are preferably connectable via a form-fit snap connection 60. The insertion part 4a has a receiving opening 6a, which corresponds in its design to the receiving opening 6 of connection part 4b provided for line 2. The connection part 4b has a connection section 62 insertable in sealed fashion into receiving opening 6a of insertion part 4a. An inner annular groove 64 is formed within the receiving opening 6[]a of insertion part 4a, in which the connection section 62 of connection part 4b engages with the elastic snap element 66. For pressure-tight sealing, a radial seal 68 can be arranged between the receiving opening 6a of insertion part 4a and the inserted connection section 62 of connection part 4b. As an alternative or in addition, an axial seal 70 can be arranged between the insertion part 4a and the connection part 4b. The axial seal 70 advantageously also secures the connection against relative movements under a pre-tension.

Because of the configuration of insertion part 4a, only the clamping element 12 need be inserted for direct connection of line 2, since the insertion part 4a is already equipped with the inner sleeve 8. However, if an indirect line connection is to occur via connection part 4b, the clamping element 12 is removed from insertion part 4a for this purpose. The inner sleeve 8 can remain in insertion part 4a.

Very high application variability is achieved by this configuration. The connection part 4b can be produced in different embodiments, especially with respect to the number and angular alignment of the connected lines. According to FIG. 6, a 90° angle piece is involved, according to FIG. 7, a T-piece and according to FIG. 8, an angle piece with a deflection angle a α=135°.

In the embodiment shown in FIG. 10, the housing body 4 contains an annular insert 72 within the region of the discharge side of the receiving opening 6. This insert 72 is inserted, in particular, pressed, into the originally cylindrical receiving opening 6, with the insert 72 containing the inner conical surface 14 or at least an essentially equivalent stepped edge or a stepped surface 14a (in this respect, see also FIG. 9) which protrudes radially inwardly and cooperates with the clamping element 12. The insert 72 advantageously results in a simple manufacture and assembly of the plug connector 1. The insert 72 preferably consists of metal, in particular, brass, but may also consist of plastic.

The invention is not restricted to the depicted and described embodiments, but also embraces all embodiments that are equivalent according to the invention.

What is claimed is:

1. A plug connector (1) for releasable connection of a pressurized line (2), the plug connector comprising:

a housing body (4) with a receiving opening (6) for insertion of one end (2a) of the line (2), and with an inner sleeve (8) attached in the housing body (4) in an arrangement extending coaxially within the receiving opening (6) for engagement into the inserted line end (2a);

a clamping element (12) mounted in the line end to move axially in the receiving opening (6) in cooperative relation with an inner conical surface (14) or stepped surface (14a) of the housing body (4) to secure the pressurized line (2) and acting radially inward against an outer periphery of the line (2) with at least one retaining edge (16) in form-fitting or friction- and form-fitting fashion;

wherein the inner sleeve (8) is rigidly attached mediatight around its periphery in the housing body (4) via a connection means (20) and engages with a sealing means (22) media-tight around the periphery into the pressurized line (2a);

wherein the inner sleeve (8) has at least one sealing torus (24) on its outer periphery as the sealing means (22), the sealing torus having an outside diameter slightly larger than the inside cross section of the line (2), so that the line (2) can be mounted frictionally onto the inner sleeve (8) with slight elastic expansion and removed from the inner sleeve, with internal sealing obtained in the mounted state; and wherein the sealing torus (24) of the inner sleeve (8), viewed axially, is arranged substantially in a region in which the retaining edge (16) of the clamping element (12) also lies in a position that secures the line (2), so that the retaining edge (16) of the clamping element (12) and the sealing torus (24) support each other with respect to their sealing and holding properties.

2. Plug connector according to claim 1, wherein the connection means (20) includes an annular collar (26) of housing body (4) extending radially inward and a mounting section (30) of inner sleeve (8) tightly attached in an opening (28) of annular collar (26).

3. Plug connector according to claim 2, characterized by the fact that the mounting section (30) of inner sleeve (8) is attached in bonded fashion and therefore tightly in opening (28) of housing-annular collar (26).

4. Plug connector according to claim 2, characterized by the fact that the mounting section (30) of inner sleeve (8) is secured in form-fitting fashion in the opening (28) of annular collar (26).

5. Plug connector according to claim 4, characterized by the fact that the inner sleeve (8) has contact means on the side of annular collar (26) facing the line-receiving opening (6) lying axially on the annular collar, especially in the form of a radial annular connector (32) or torus (34), and fixation means on the opposite end of mounting section (30), especially in the form of a radial, preferably conical sleeve expansion (36).

6. Plug connector according to claim 4, characterized by the fact that the connection means (20) are formed by a form-fit snap connection.

7. Plug connector according to claim 2, characterized by the fact that the mounting section (30) of inner sleeve (8) is pressed into the opening (28) of annular collar (26), directly or indirectly via an annular press-fit element (37).

8. Plug connector according to claim 1, characterized by the fact that the inner sleeve (8) is sealed via at least one elastic peripheral seal (38) against housing body.

9. Plug connector according to claim 8, characterized by the fact that the peripheral seal (38) sits radially between the housing-annular collar (26) and mounting section (30) of inner sleeve (8).

10. Plug connector according to claim 1 characterized by the fact that a counterconical surface (40) is arranged within housing body (4) so that the clamping element (12) can be spread radially to release line (2) by displacement against counterconical surface (40).

11. Plug connector according to claim 10, characterized by the fact that the counterconical surface (40) is formed on an annular connector (32) designed in one piece with inner sleeve (8).

12. Plug connector according to claim 10, characterized by the fact that the counterconical surface 40 is formed on an axial annular projection (42) designed in one piece with the housing-annular collar (26).

13. Plug connector according to claim 1 characterized by the fact that the housing body (4) is designed as a peripherally tight press-fit cartridge insertable into a hole of an aggregate part.

14. Plug connector according to claim 13, characterized by the fact that the housing body (4) has mounting and sealing means (50) on its outer peripheral surface (48).

15. Plug connector according to claim 1 characterized by the fact that the housing body (4), within its region that cooperates with the clamping element (12) in order to hold the line (2), is realized in one piece or contains an insert (72) that, in particular, can be pressed in.

16. Transitional connector (52), characterized by at least two plug connectors (1) according to one of the preceding claims, in which the housing body (4) is a common, especially one-piece component, and has a corresponding number of line receiving openings (6).

17. A plug connector, according to claim 1, comprising a housing body (4) with at least one receiving opening (6) for sealing insertion that can be locked against loosening of a line (2), characterized by the fact that the housing body (4) consists of two joinable individual parts, an insertion part (4a) insertable into a hole (44) of an aggregate part (46) and a connection part (4b) connectable to line (2), in which the insertion part (4a) is designed so that it can be joined either to connection part (4b) or directly to line (2).

18. Plug connector according to claim 16, characterized by the fact that the insertion part (4a) and the connection part (4b) are connectable via a form-fit snap connection (60).

19. Plug connector according to claim 16, characterized by the fact that the insertion part (4a) has a receiving opening (6a) that largely corresponds in its design to the receiving opening (6) of connection part (4b), in which the connection part (4b) has a connection section 62 that can be inserted into the receiving opening (6a) of insertion part (4a).

20. Plug connector according to claim 19, characterized by the fact that an internal annular groove (64) is formed within receiving opening (6a) of insertion part (4a), in which the connection section (62) of connection part (4b) engages with elastic snap element (66).

21. Plug connector according to claim 18, characterized by the fact that a radial seal (68) is arranged between the receiving opening (6a) of insertion part (4a) and the inserted connection section (62) of connection part (4b) or an axial seal (70) is arranged between the insertion part (4a) and connection part (4b).

* * * * *

UNITED STATES PATENT AND TRADEMARK OFFICE
CERTIFICATE OF CORRECTION

PATENT NO. : 6,554,323 B1 Page 1 of 1
DATED : April 29, 2003
INVENTOR(S) : Salomon-Bahls et al.

It is certified that error appears in the above-identified patent and that said Letters Patent is hereby corrected as shown below:

Title page,
Item [30], Foreign Application Priority Data, please correct one priority reference to read as follows:
-- July 26, 1999      (DE)      299 21 935 U --

Column 1,
Line 16, should read as follows:
-- the receiving opening, so that it cooperates with an inner --

Column 3,
Line 64, should read as follows:
-- behind annular collar 26 in form-fit fashion. --
Line 65, should read as follows:
-- In the embodiment according to FIG. 9, an annular or --

Column 4,
Line 14, should read as follows:
-- annular coller 26, which protrudes radially inwardly. --
Line 18, should read as follows:
-- respect, see, in particular, FIG. 10. The pressed-in surfaces --

Column 5,
Line 52, should read as follows:
-- 6a of insertion part 4a, in which the connection section --

Signed and Sealed this

Thirtieth Day of September, 2003

JAMES E. ROGAN
*Director of the United States Patent and Trademark Office*